(12) United States Patent
Akima

(10) Patent No.: US 6,202,627 B1
(45) Date of Patent: Mar. 20, 2001

(54) V-TYPE MULTI-CYLINDER INTERNAL COMBUSTION ENGINE

(75) Inventor: Kazuhiro Akima, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/344,249

(22) Filed: Jun. 25, 1999

(30) Foreign Application Priority Data

Aug. 5, 1998 (JP) .................................................. 10-221579
Aug. 5, 1998 (JP) .................................................. 10-221581

(51) Int. Cl.$^7$ ...................................................... F02D 1/00
(52) U.S. Cl. ..................................... 123/336; 123/184.34
(58) Field of Search ........................ 123/184.34, 184.47, 123/184.42, 184.53, 184.59, 336

(56) References Cited

U.S. PATENT DOCUMENTS

| | | | |
|---|---|---|---|
| 5,018,485 | * 5/1991 | Washizu et al. | 123/184.53 |
| 5,063,885 | * 11/1991 | Yoshioka | 123/184.34 |
| 5,109,811 | * 5/1992 | Yanaka et al. | 123/184.53 |
| 5,551,387 | * 9/1996 | Carter et al. | 123/184.53 |
| 5,630,386 | * 5/1997 | Uchida | 123/184.34 |
| 5,653,201 | * 8/1997 | Hosoya | 123/184.34 |
| 5,957,108 | * 9/1999 | Kato | 123/336 |

FOREIGN PATENT DOCUMENTS 7-102979  4/1995 (JP) .

* cited by examiner

Primary Examiner—John Kwon
(74) Attorney, Agent, or Firm—Armstrong, Westerman, Hattori, McLeland & Naughton (57) ABSTRACT

A V-type multi-cylinder internal combustion engine having a high volumetric efficiency and a high output torque is provided. Ignitions in right and left banks occur alternately and at equal intervals. A suction manifold shaped symmetrically in respect of right and left is disposed between the right and left banks. The suction manifold comprises right and left throttle base, a suction manifold upper formed with right and left suction passages communicating with respective suction ports in the left and right banks and arranged one by one alternately, right and left first chambers formed at contact surface portions between the throttle bases and the suction manifold upper, a suction manifold lower having right and left chambers. The right and left first chambers and the right and left second chambers always communicate with each other, respectively. Right and left second suction passages for connecting the right and left second chambers with the respective suction ports through the right and left first suction passages are formed around the right and left second chambers. The suction manifold is fixed on right and left cylinder heads by attaching the suction manifold upper to the cylinder heads.

17 Claims, 10 Drawing Sheets

V-TYPE MULTI-CYLINDER INTERNAL COMBUSTION ENGINE

BACKGROUND OF THE INVENTION

The present invention relates to a V-type multi-cylinder internal combustion engine, particularly to a suction manifold of the engine and a variable suction device of the engine for switching over the suction characteristic so as to obtain a high volumetric efficiency over a wide rotative speed region from a low rotative speed region to a high rotative speed region.

In an internal combustion engine for a vehicle, it is desired to reduce rotative speed of the engine for improving fuel consumption or reducing noise on operation. For this purpose, improvement of torque on low speed rotation is necessary, and in order to improve torque on low speed rotation, improvement of volumetric efficiency of suction must be contrived.

In general, it has been carried out that length or volume of a suction pipe of an internal combustion engine is changed in accordance with rotative speed of the engine to maintain a high volumetric efficiency over a wide rotative speed region from a low speed region to a high speed region utilizing combination of inertia supercharging effect and resonance (pulsation) effect of the suction air.

Also in the V-type multi-cylinder internal combustion engine, a construction capable of increasing suction pipe length of a suction manifold in a low rotative speed region is desired. On the one hand, when the suction manifold is provided with a pipe length switchover construction, inertia supercharging effect in a high rotative speed region often undergoes a bad influence, so that a construction having little influence on the inertia supercharging effect in the high rotative speed region is desired.

Further, in order to reduce a rambling noise resulting from unequal lengths of suction pipes measured from a suction sound source, equalizing of the suction pipe lengths including preparation of a surge tank is desired. However, particularly in case of the V-type multi-cylinder internal combustion engine, a clearance must be ensured within an engine room between the engine and a bonnet hood so that degree of freedom of shape of the suction pipe is small.

Simplification of pipes around the suction manifold including a breather pipe and a blow-by gas returning passage (PCV passage) is also desired.

Japanese Laid-Open Patent Publication No. 7-102979 discloses an improved V-type multi-cylinder internal combustion engine which can satisfy the above-mentioned various demands.

The internal combustion engine described in the Japanese publication has manifold suction pipes crossing each other and communicating with respective cylinders in right and left banks opposite to each other in V-shape, and surge tanks of a predetermined volume disposed above the manifold suction pipes. The manifold suction pipes are connected to the surge tanks with sections of J-shape, branch short-circuit passages short-circuiting middle parts of the manifold suction pipes to the surge tanks are opened at an partition wall partitioning the manifold suction pipes and the surge tanks, and branch control valves for opening and closing the branch short-circuit passages in accordance with operation condition are provided. In a communication passage connecting the surge tanks with each other is provided a tank control valve for opening and closing the communication passage in accordance with operation condition.

In the above-mentioned engine of the Japanese publication, entire height of the engine can be restrained sufficiently ensuring length of the suction pipes and volume of the surge tanks. By adequately controlling opening and closing of the branch control valve and the tank control valve in accordance with operation condition of the engine, a high volumetric efficiency can be maintained over a wide rotative speed region from a low speed to a high speed of the engine utilizing combination of supercharging effects based on inertia and resonance.

An internal combustion engine provided with variable valve timing switchover means for switching over suction characteristic of a suction valve and suction passage switchover means capable of switching over characteristic of a suction passage has been disclosed by Japanese Laid-Open Patent Publication No. 1-262317.

SUMMARY OF THE INVENTION

An object of the present invention is to provide a suction manifold of a V-type multi-cylinder internal combustion engine which has a larger suction pipe length and a larger chamber (surge tank) volume compared with the above-mentioned engines of the Japanese publications to obtain a high torque in the low rotative speed region and can be disposed between right and left banks easily and compactly.

In order to achieve the above object, the present invention provides, a V-type multi-cylinder internal combustion engine in which ignition in a right bank and ignition in a left bank occur alternately and at equal intervals, and a suction manifold shaped symmetrically in respect of right and left is disposed between the right and left banks, said suction manifold comprising:

a pair of right and left throttle bases to be connected with respective right and left throttle bodies;

a suction manifold upper positioned between said right and left throttle bases, integrally formed with right first suction passages communicating with respective suction ports of cylinders in said left bank and left first suction passages communicating with respective suction ports of cylinders in said right bank, said right first suction passages and said left first suction passages being arranged one by one alternately crossing each other;

a right first chamber formed at a contact surface portion between said right throttle base and said suction manifold upper;

a left first chamber formed at a contact surface portion between said left throttle base and said suction manifold upper; and a suction manifold lower integrally connected to and positioned under said manifold upper having a right second chamber and a left second chamber, wherein said right first chamber and said right second chamber always communicate with each other through a right communication passage;

said left first chamber and said left second chamber always communicate with each other through a left communication passage;

right second suction passages for connecting said right second chamber with said respective suction ports of cylinder in the left bank through said right first suction passages and left second suction passages for connecting said left second chamber with said respective suction ports of cylinders in the right bank through said left first suction passages are formed around said right and left second chambers and arranged one by one alternately crossing each other; and said suction manifold is fixed on right and left cylinder heads by attaching said suction manifold upper to said right and left cylinder heads.

According to the invention, in a V-type multi-cylinder internal combustion engine in which ignition in a right bank and ignition in a left bank occur alternately and at equal intervals, and a suction manifold shaped symmetrically in respect of right and left is disposed between the right and left banks, the suction manifold is constructed by integrally assembling four parts, that is, a pair of right and left throttle base, a suction manifold upper and a suction manifold lower.

Since thus the right and left throttle bases are formed as separate parts, the suction manifold can be fixedly disposed between the right and left banks easily by fixing the suction manifold upper onto the right and left cylinder heads. Further, the suction manifold can be attached to the V-type multi-cylinder internal combustion engine utilizing the space between the right and left banks to lower entire height of the engine.

The right and left first chambers always communicate with the right and left second chambers, respectively, and the right and left second suction passages connecting the right and left chambers to respective suction ports of cylinders in the left and right banks through the right and left first suction passages, respectively, are formed integrally around the right and left second chambers.

As a result, the second suction passages can be made very long so that very long suction pipe lengths can be ensured in low rotative speed region of the engine. Therefore, inertia supercharging effect of suction is improved to obtain a high volumetric efficiency and output torque in low rotative speed region of the engine can be improved.

Since the right and left first chambers always communicate with the right and left second chambers, respectively, large chamber volume can be ensured so that improvement of volumetric efficiency based on inertia supercharging effect of suction is possible. In addition, interference of suction airs supplied to respective suction ports of cylinders in the right and left banks can be prevented.

If suction additive gas passages are formed on contacting surfaces between the suction manifold upper and the right and left cylinder heads, passages for the suction additive gas such as blow-by gas and breathing gas can be formed integrally within the suction manifold so that it becomes possible to simplify construction of passages including hot water pipes and the number of parts can be reduced.

Another object of the present invention is to provide a variable suction device of a V-type multi-cylinder internal combustion engine capable of switching over suction characteristic in a wide rotative speed region of the engine from a low rotative speed region to a high rotative speed region to obtain higher volumetric efficiency and higher output torque compared with those of the above-mentioned engines of the Japanese publication.

In order to achieve the above object, the present invention provides, a V-type multi-cylinder internal combustion engine in which ignition in a right bank and ignition in a left bank occur alternately and at equal intervals, having variable valve timing switchover mechanisms provided at respective cylinders in right and left banks for switching over suction characteristics of the cylinders between a low-speed mode and a high-speed mode by changing working characteristics of suction valves of the cylinders, a suction passage switchover mechanism for switching over suction characteristic of a suction passage among a low-speed mode, a middle-speed mode and a high-speed mode, and a suction manifold shaped symmetrically in respect of right and left disposed between the right and left banks, said variable valve timing switchover mechanisms and said suction passage switchover mechanism being switched over in accordance with rotative speed of said engine, wherein said suction manifold comprising:

a right first chamber to be connected to a right throttle body;

a left first chamber to be connected to a left throttle body;

right first suction passages directly communicating with respective suction ports of cylinders in said left bank;

left first suction passages directly communicating with respective suction ports of cylinders in said right bank;

a right second chamber positioned at a middle bottom part between said right and left banks, always communicating with said right first chamber through a right first communication passage;

a left second chamber positioned at a middle bottom part between said right and left banks, always communicating with said left first chamber through a left first communication passage;

right second suction passages connecting said right second chamber to respective base end portions of said right first suction passages, each formed in shape of a swirl surrounding said left and right second chambers in turn;

left second suction passages connecting said left second chamber to respective base end portions of said left first suction passages, each formed in shape of a swirl surrounding said right and left second chambers in turn;

right first opening-shutting valves disposed in said right first suction passages at upper stream side portions of said base end portions connected to said second right suction passages, for connecting said right first suction passages to said right first chamber to switch over the suction characteristic of the suction passage from the low-speed mode to the middlespeed mode;

left first opening-shutting valves disposed in said first left suction passages at upper stream side portions of said base end portions connected to said second left suction passages, for connecting said left first suction passages to said left first chamber to switch over the suction characteristic of the suction passage from the low-speed mode to the middle-speed mode;

a second opening-shutting valve disposed in a second communication passage connecting said right and left first communication passages to each other for intercepting communication between said right and left first communication passages to switch over the suction characteristic of the suction passage from the middle-speed mode to the high-speed mode, thereby, after switchover of the suction characteristic by said second opening-shutting valve, switchover of the suction characteristic from the low-speed mode to the high-speed mode by said variable valve timing switchover mechanisms can be carried out.

In the above V-type multi-cylinder internal combustion engine in which ignition in the right bank and ignition in the left bank occur alternately and at equal intervals, the variable valve timing switchover mechanism changes working characteristic of suction valves of respective cylinders in the right and left banks in accordance with rotative speed of the engine to switch over its suction characteristic between a low speed mode and a high speed mode, and the suction passage switchover mechanism switches over suction characteristic of the suction passage among a low speed mode, a middle speed mode and a high speed mode in accordance with rotative speed of the engine.

In the suction manifold disposed between right and left banks symmetrically in respect of right and left, the right and left first chambers always communicate with the right and left second chambers through the right and left first communication passages, respectively, the right first suction passages and the left first suction passages, which are directly connected to suction ports of respective cylinders of the left and right banks, are provided, and the right second suction passages connecting the right second chamber to respective base end portions of the right first suction passages and the left second suction passages connecting the left second chamber to respective base end portions of the left first suction passages are formed in shape of swirls integrally surrounding the right and left second chambers from left to right and from right to left respectively.

In the right and left first suction passages are disposed the respective first opening-shutting valves at upper stream side portions of the above-mentioned base end portions for connecting respective first suction passages to the corresponding first chamber to switch over the suction characteristic of the suction passage from the low-speed mode to the middle speed mode, and in the second communication passage connecting the right and left first communication passages to each other is disposed the second opening-shutting valve for intercepting communication between the first right and left first communication passages to switch over the suction characteristic of the suction passage from the middle speed mode to the high speed mode.

Further, after changeover of the suction characteristic by the second opening-shutting valve, changeover of the suction characteristic from the low-speed mode to the high-speed mode by the variable timing switchover mechanism can be carried out.

When the engine is set at the low speed mode, that is in the low rotative speed region of the engine including very low rotative speed, the first opening-shutting valves are closed to shut off direct communication of the right and left first suction passages with the right and left first chamber, respectively, so that on each of the right and left sides, long suction passages are formed using the first suction passages and the second suction passages. Furthermore, since the second opening-shutting valve is opened and the right and left first communication passages are connected with each other, all of the first and second suction passages and all of the first and second chambers communicate with each other, so that a single large-volume inertia chamber can be formed. Therefore, a high inertia supercharging effect adapted to the low speed mode of the engine and a high volumetric efficiency can be obtained to improve output torque in the low speed mode of the engine. In addition, interference of suction airs supplied to the suction ports of the cylinders can be prevented.

When engine rotative speed rises to the middle rotative speed region (middle speed mode), the first opening-shutting valves are opened and the right and left first suction passages are directly connected to the right and left first chambers respectively to obtain short suction passages using the first suction passages. Thus, flow resistance of suction air flowing in the suction passage can be restrained to raise suction efficiency, so that a high inertia supercharging effect adapted to the middle speed mode of the engine and a high volumetric efficiency can be obtained.

When the engine rotative speed rises further and reaches the high rotative speed region, the second opening-shutting valve is closed and the right first and second chambers and the left first and second chambers are completely separated to form right and left chamber systems independent of each other having no overlapping suction stroke (ignition time).

The right and left chamber systems communicate with suction ports of respective cylinders in the left and right banks respectively through the corresponding first and second suction passages. The right chamber system functions as a resonance chamber for the cylinders in the left bank and the left chamber system functions as a resonance chamber for the cylinders in the right bank. Each chamber system exerts a resonance (pulsation) effect on other cylinder under suction stroke in the corresponding bank and a high resonance supercharging effect and a high volumetric efficiency can be obtained as a whole.

When the engine rotative speed rises continuously, the variable valve timing switchover mechanism is switched over from the low speed mode to the high speed mode so that working characteristic of the suction valve is enhanced and a large quantity of the suction air can be taken in. Since the first opening-shutting valves are kept open and the second opening-shutting valve is kept close, flow resistance of the suction air flowing in the suction passage restrained to raise suction efficiency and a high volumetric efficiency can be obtained as a whole by resonance (pulsation) effect exerted on other cylinder under suction stroke in the corresponding bank. Therefore, still higher resonance supercharging effect and still higher volumetric efficiency can be obtained.

DETAILED DESCRIPTION OF THE PREFERRED EMBODIMENT

Hereinafter, a preferred embodiment of the present invention will be described with reference to FIGS. 1 to 10.

Figure 2:
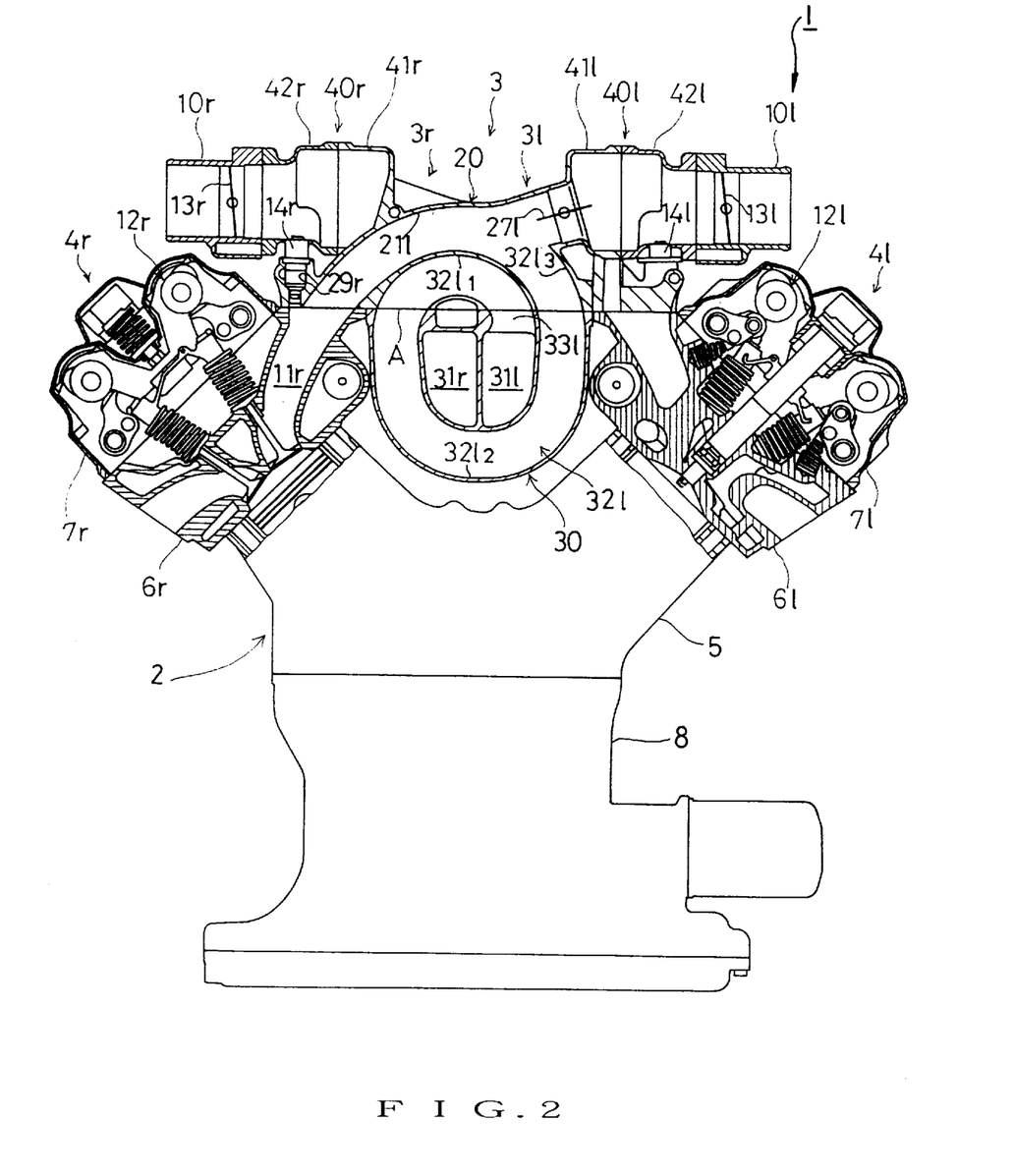
FIG. 2 is a section taken along the line II—II of FIG. 1.
Figure 3:
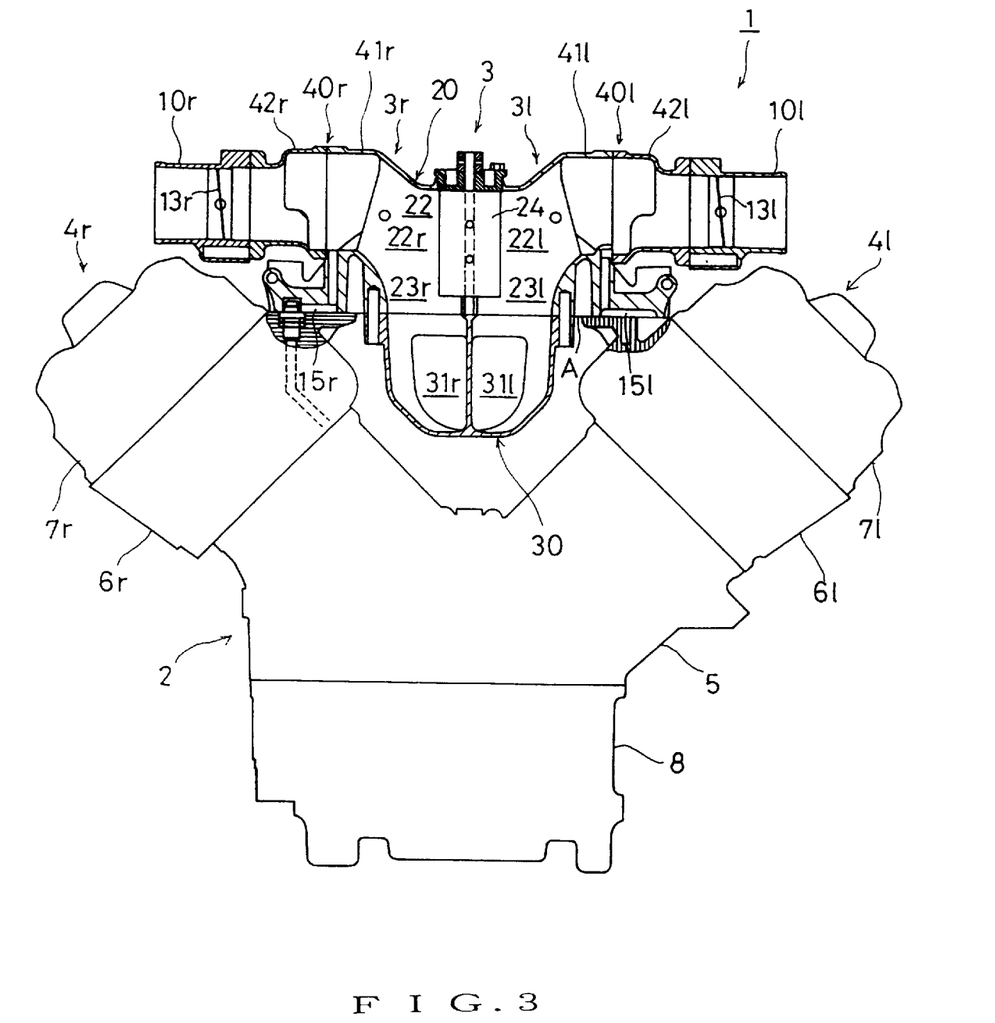
FIG. 3 is a section taken along the line III—III of FIG.

FIGS. 2 and 3 are sections viewed from the front rearward in respect of traveling direction of a vehicle. Therefore, the right (left) side in these figures is the left (right) side in respect of the vehicle traveling direction. Accordingly, in FIGS. 2, 3, a right bank 4r and a left bank 4l are shown on the left side and on the right side respectively, for example.

The V-type eight-cylinder internal combustion engine 1 shown in FIGS. 1 to 4 is mounted on a front body of a motorcar having a crankshaft (not shown) directed in the longitudinal direction of the car. The crankshaft accommodated in a cylinder block 5 is a plane type crankshaft (180 degree type crankshaft). A main body 2 of the V-type eight-cylinder internal combustion engine having the right and left banks 4r, 4l is composed of the cylinder block 5, right and left cylinder heads 6r, 6l attached on right and left upper portions of the cylinder block 5 respectively, right and left cylinder head covers 7r, 7l attached on upper portions of the right and left cylinder heads 6r 6l respectively, and an oil pan 8 attached to a lower portion of the cylinder block 5. Ignition in the right bank 4r and ignition in the left bank 4l occur alternately and at equal intervals. A suction manifold 3 is disposed between the right and left banks 4r, 4l The suction manifold 3 comprising right and left suction systems 3r, 3l which are independent of each other, is integrally assembled by four separate parts and formed symmetrically in respect of right and left (but being slightly out of phase in the traveling direction).

The left suction system 3l supplies suction ports 11r of cylinders in the right bank 4r with suction air, and the right suction system 4r supplies suction ports 11l (not shown in FIG. 2) of cylinders in the left bank 4l with suction air. The suction manifold 3 has variable suction (pipe length switchover, resonance switchover) means as will be stated later. Right and left exhaust manifolds (not shown) are also formed symmetrically in respect of right and left.

Figure 6:
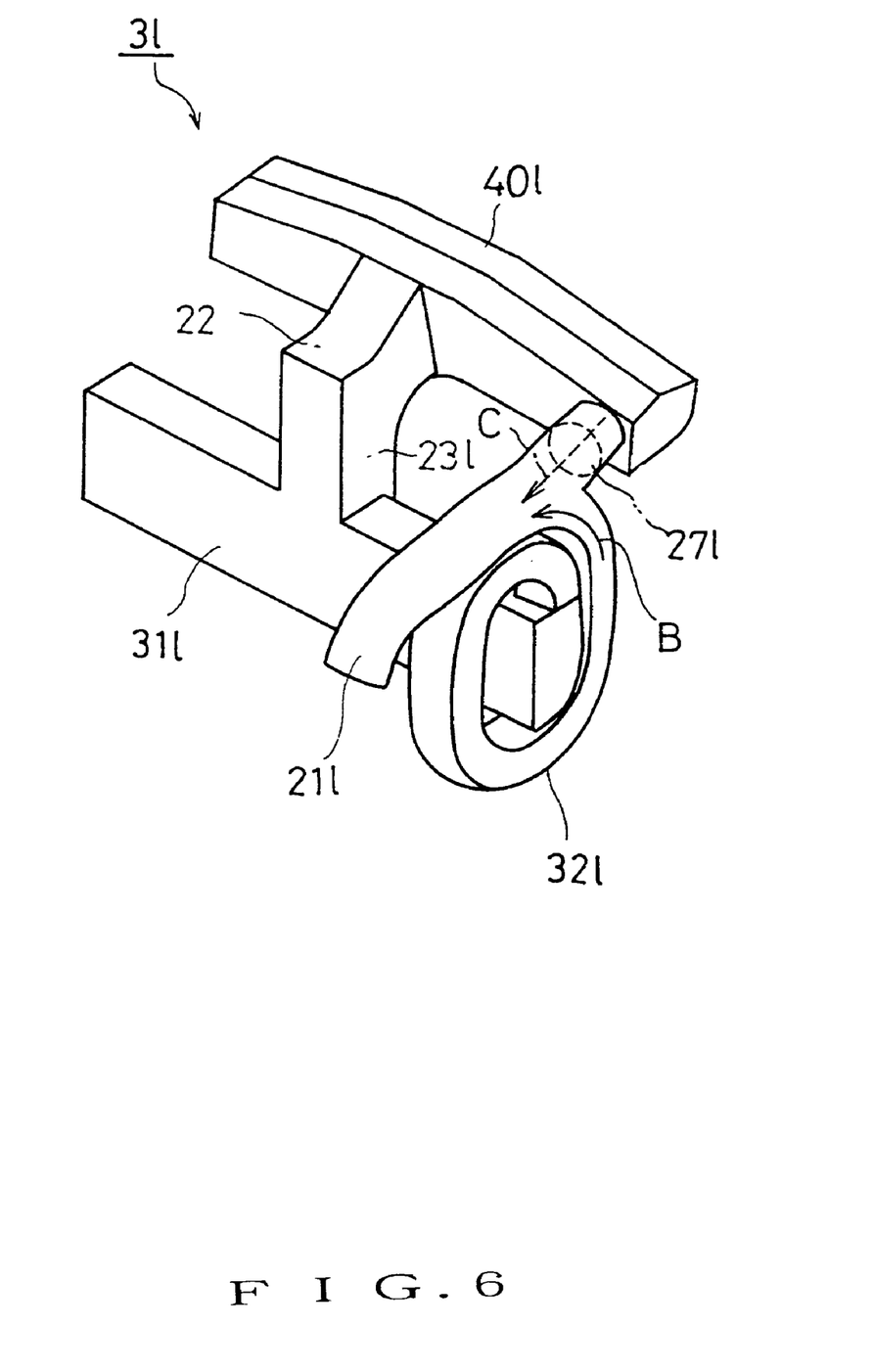
FIG. 6 is an illustration showing a construction for connecting left suction chambers with left suction passages.
Figure 7:
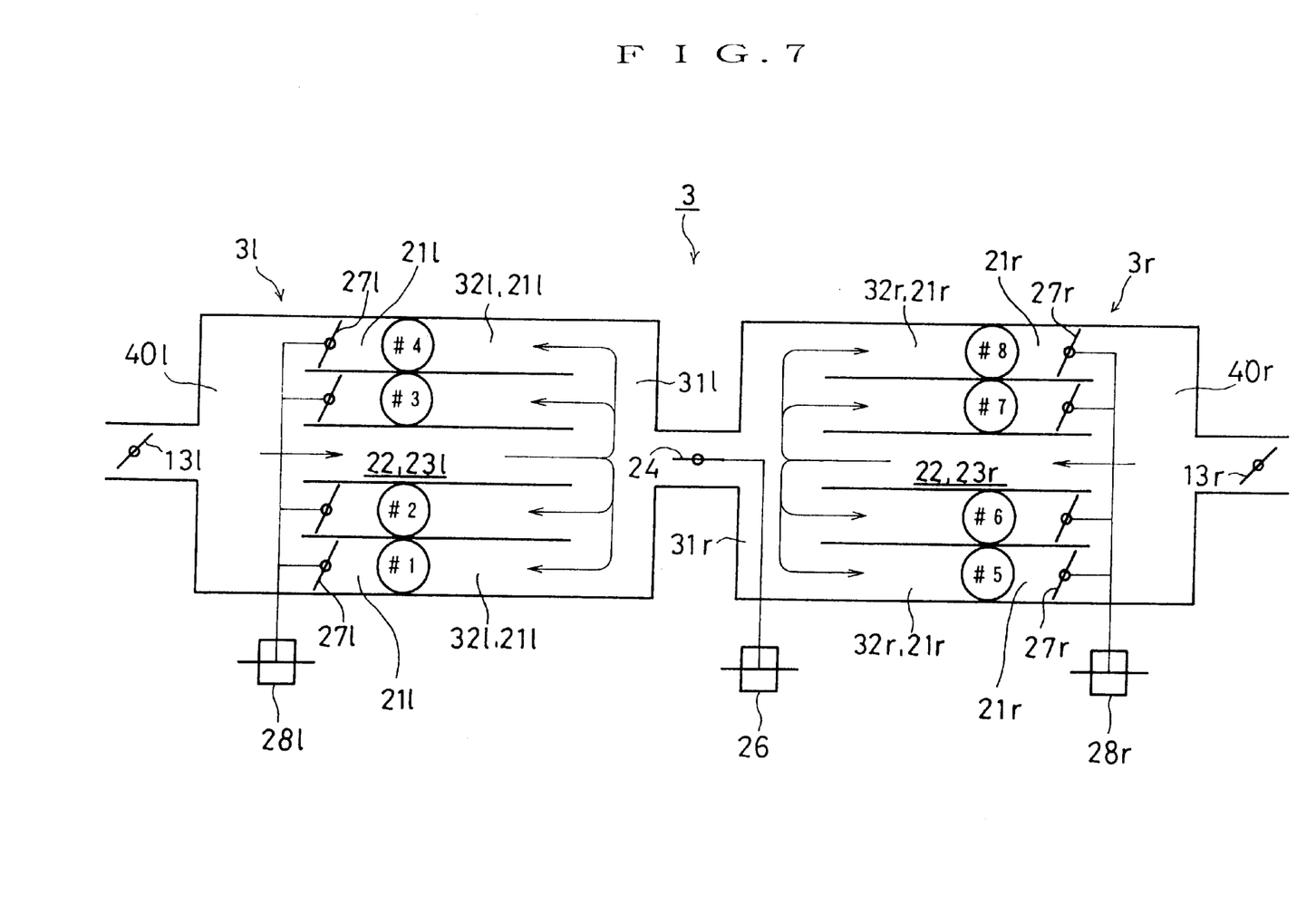
FIG. 7 is an illustration showing a working state of the variable suction device of the suction manifold.

Suction air in the left suction system 3l flows into the suction ports 3r of cylinders in the right bank 4r, and suction air in the right suction system 3r flows into the suction ports 3l of cylinders in the left bank 4l. The right and left suction system 3r, 3l are illustrated in FIGS. 6 and 7 plainly and will be explained later in detail. The right suction system 3r is not shown in FIG. 6 but has the same construction as that of the left suction system 3l.

Upper stream ends of the right and left suction systems 3r, 3l are right and left chambers 40r, 40l functioning as surge tanks (first chamber).

Each of the first chambers 4r, 4l is constructed of two casing blocks airtightly connected to each other with bolts. One of the two casing blocks is an inner half body 41l (41r) formed integrally with a suction manifold upper 20 by casting. Another casing block is an outer half body (throttle base) 42l (42r) formed by casting together with a throttle body attaching flange 43l (43r) provided at a lengthwise central portion. The right and left throttle bases 42r, 42l are respective independent parts for constituting the suction manifold 3. 10l, 10r denote throttle bodies, and 13l, 13r are throttle valves attached in the throttle bodies 10l, 10r.

Figure 5:
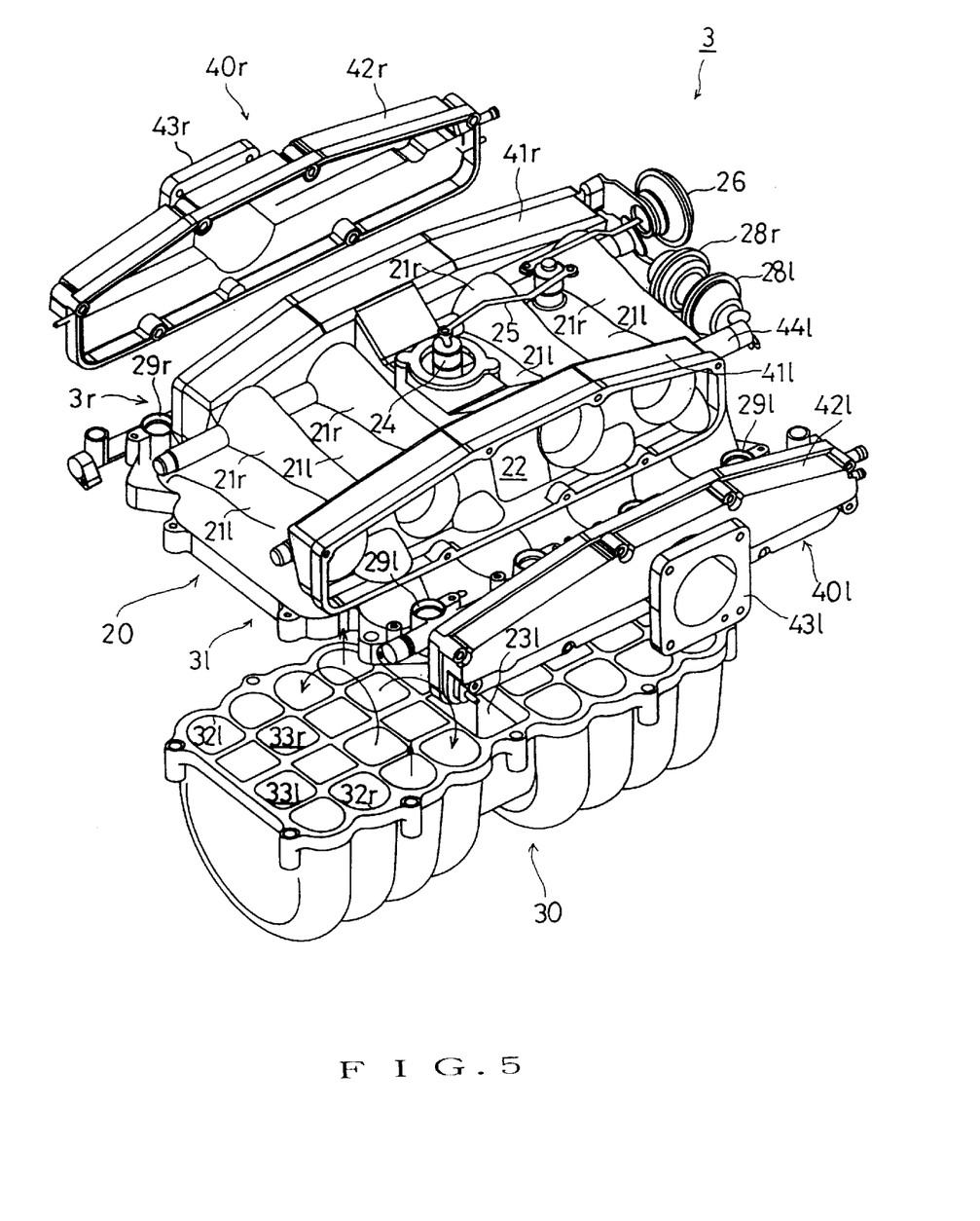
FIG. 5 is an exploded perspective view of a suction manifold in the embodiment of FIG. 1.

Each of the right and left suction systems 3r, 3l has four manifold suction pipes 21r (21l) constituting a first suction passage section. As shown in FIG. 5 more clearly, the right manifold suction pipes 21r and the left manifold suction pipes 21l are arranged alternately crossing each other and cast together with the above-mentioned inner half bodies 41r, 41l in one body to form a suction manifold upper 20.

Figure 4:
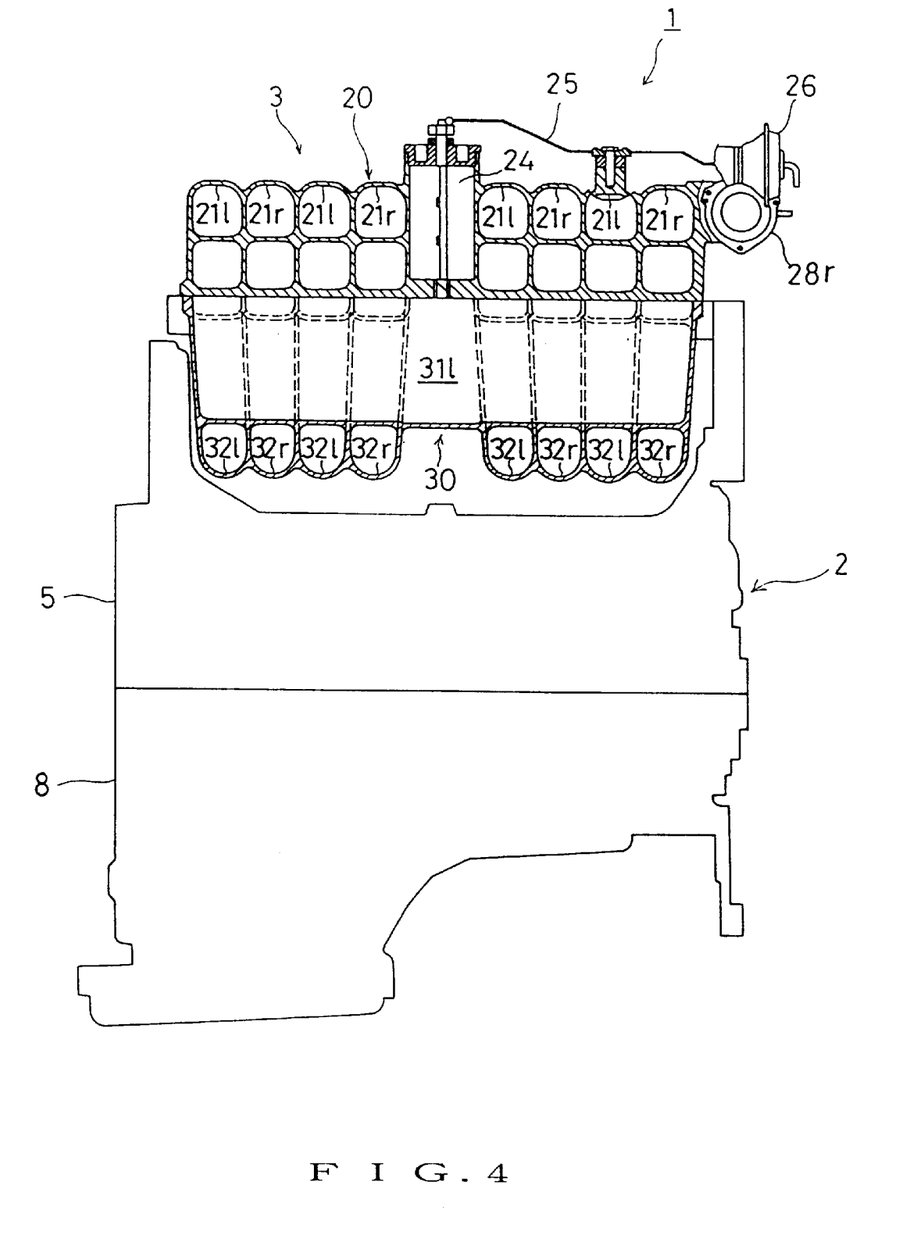
FIG. 4 is a section taken along the line IV—IV of FIG. 1.

A suction manifold lower 30 is attached on a bottom of the suction manifold upper 20 airtightly by bolts. The suction manifold lower 30 is a cast block having a semicircular shape as shown in FIG. 5. As shown in FIGS. 2 to 4, at a center part of the suction manifold lower 30 are formed a left second chamber 31l and a right second chamber 31r (not shown in FIG. 4) which are elongated in the longitudinal direction of the suction manifold.

Each of the left second chamber 31l and the right second chamber 31r has four upper openings 23l (23r). The left and right upper openings 33l, 33r are disposed alternately. Each of the left upper openings 33l are connected to respective left swirl pipes 32l and each of the right upper openings 33r are connected to respective right swirl pipes 32r.

Arcuate base end portions $32l_1$, $32r_1$ and end portions $32l_3$, $32r_3$ of the left and right swirl pipes 32l, 32r are formed in the bottom of the suction manifold upper 20 (see FIG. 2, but 32r, $32r_1$, $32r_3$ are not shown). The left swirl pipes 32l constitute a second suction passage section of the left suction system 3l, and the right swirl pipes 32r constitute a second passage section of the right suction system 3r.

The left swirl pipes 32l and the right swirl pipes 32r wind round the right and left second chambers alternately in directions opposite to each other. The end portions $32l_3$ of the left swirl pipes 32l are connected to respective base end portions of the left manifold suction pipes 21l tangentially, and the end portions $32r_3$ of the right swirl pipes 32l are connected to respective base end portions of the right manifold suction pipes 21r tangentially. Middle portions $32l_2$, $32r_2$ of the swirl pipes 32l, 32r wind round the second chambers 31l, 31r in U-shape (see FIG. 2. $32r_2$ not shown).

Left pipe length switchover valves (left first opening-shutting valves) 27l are disposed in the left manifold suction pipes 21l at upper stream side of the base end portions thereof connected to the end portions $32l_3$ of the left swirl pipes 32l, as shown in FIG. 2. Similarly, though not shown in FIG. 2, right pipe length switchover valves 27r are disposed in the right manifold suction pipes 21r. The pipe length switchover valves 27l (27r) are opened or closed to connect or disconnect the first chamber 40l (40r) with the manifold suction pipes 21l (21r).

Figure 1:
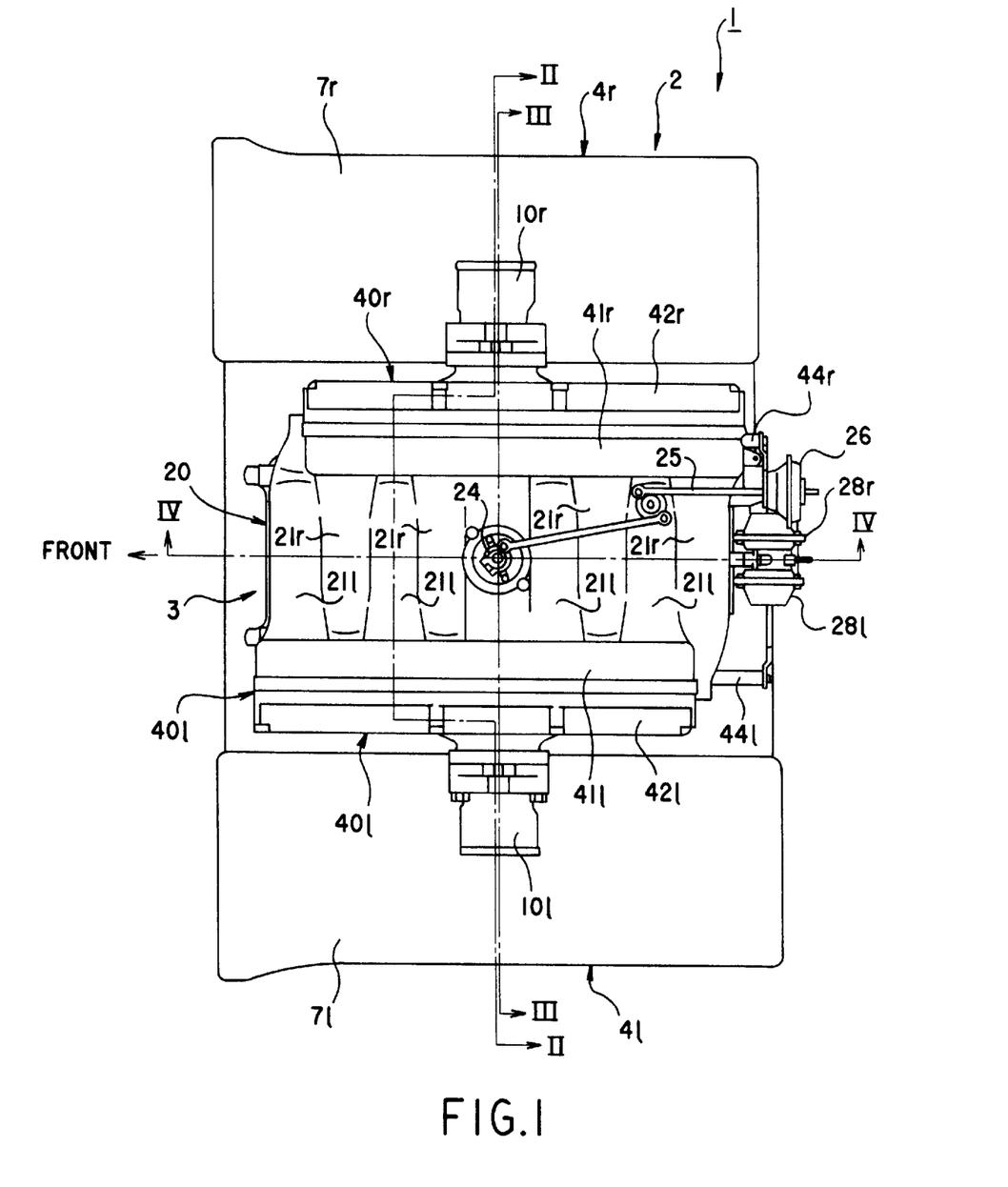
FIG. 1 is a schematic plan view of a V-type multi-cylinder internal combustion engine according to an embodiment of the present invention.

Opening and closing of the pipe length switchover valves 27l, 27r are controlled in accordance with operating condition of the engine (rotative speed, vehicle speed or the like) by diaphragms 28l, 28r through common valve spindles 44l, 44r and link mechanisms, respectively (FIG. 1). The diaphragms 28l, 28r are combined integrally through a common negative pressure chamber and attached to a central portion of a rear wall of a rearmost right manifold suction pipe 21r.

A lower surface of the suction manifold upper 20 on which the manifold suction pipes 21l, 21r, the arcuate base end portions $32l_1$, $32r_1$ of the swirl pipes 32l, 32r and the end portions $32l_3$, $32r_3$ of the pipes 32l, 32r are opened is made flat to form an attaching face A to the right and left cylinder heads 6r, 6l of the engine main body 2 and the suction manifold lower 30. Therefore, the suction manifold 3 is fixedly placed on the right and left cylinder heads 6r, 6l by the attaching face A and disposed between the right and left banks 4r, 4l.

The second chamber 31l. 31r are connected to the base end portions of each manifold suction pipes 21l, 21r through the upper openings 33l, 33r and the swirl pipes 32l, 32r (refer to FIG. 2 and arrows in FIG. 5. 32r, 21r are not shown in FIG. 2).

The left first chamber 40l and the right first chamber 40r can communicate with each other through a communication passage (second communication passage) 22 at a lengthwise middle portion thereof. The communication passage 22 is provided with a resonance switchover valve (second opening-shutting valve) 24, and the first chambers 40l, 40r are connected or disconnected by opening or closing the valve 24. The communication passage 22 is positioned at a lengthwise middle position of the banks 4l, 4r.

Opening and closing of the resonance switchover valve 24 is controlled in accordance with operating condition of the engine (rotative speed, vehicle speed or the like) by a diaphragm 26 through a link mechanism 25 (FIG. 1). As shown in FIG. 1 and FIGS. 3 to 5, the resonance switchover valve 24 is sub-assembled and inserted in the communication passage 24 passing through an opening formed in an upper wall of the suction manifold upper 20. A tip end of a valve spindle of the valve 24 is supported by a bearing provided at an inner wall of the suction manifold upper 20.

The diaphragm 26 is positioned near the diaphragms 28*l*, 28*r* and these diaphragms 26, 28*l*, 28*r* are disposed on the rear wall of the suction manifold 3 intensively.

Lengthwise middle portions of the left and right second chambers 31*l*, 31*r* are connected to left and right half parts 22*l*, 22*r* of the communication passage 22 through the left and right communication passages 23*l*, 23*r* respectively, and further connected to the left and right first chamber 40*l*, 40*r* through the left and right half parts 22*l*, 22*r* respectively.

Therefore, the left second chamber 31*l* communicates with the left first chamber 40*l* always, and the right second chamber 31*r* communicates with the right first chamber 40*r* always. The communication passages 32*l*, 32*r* are also positioned at the lengthwise middle of the banks 4*l*, 4*r* and formed extending across the suction manifold upper 20 and the suction manifold lower 30.

The communication passage 23*l* and the left half part 22*l* of the communication passage 22 constitute a left first communication passage, and the communication passage 23*r* and the right half part of the communication passage 22 constitute a right first communication passage. The communication passage 22, which constitutes a second communication passage, connects the left first chamber 40*l* with the right first chamber 40*r* as well as connects the left first communication passage with the right first communication passage, so that when the resonance switchover valve 24 is opened at low and middle modes of the engine, all chambers 40*l*, 40*r*, 31*l*, 31*r* communicate with each other.

At that time, the chambers 40*l*, 40*r*, 31*l*, 31*r* function as a single large-capacity inertia chamber for the suction ports 11*l*, 11*r* of respective cylinders in the left and right banks 4*l*, 4*r* to improve volumetric efficiency based on inertia supercharging effect, and prevent interference of suction airs supplied to respective suction ports 11*l*, 11*r*.

In a high speed mode of the engine, the resonance switchover valve 24 is closed to shut the communication passage 22. In this case, the left first and second chambers 40*l*, 31*l* always communicating with each other through the left first communication passage and the right first and second chambers 40*r*, 31*r* always communicating with each other through the right first communication passage are completely independent of each other to constitute respective left and right chamber systems. The left and right chamber systems function as resonance chambers for respective cylinders of the right and left banks 4*r*, 4*l*, in which suction strokes are not overlapped, so that improvement of volumetric efficiency based on resonance supercharging effect is possible.

The left suction system 3*l* is constituted by connecting the left first and second chambers with the left first suction passage section (the left manifold suction pipes 21*l*) and the left second suction passage section (the left swirl pipes 32*l*). Similarly, the right suction system 3*r* is constituted by connecting the right first and second chambers with the right manifold suction pipes 21*r* and the right swirl pipes 32*r*.

The variable suction device of the V-type Multi-cylinder internal combustion engine 1 in the present embodiment includes variable valve timing switchover mechanisms 12*l*, 12*r* (FIG. 2) provided at suction valve moving mechanisms.

Figure 10:
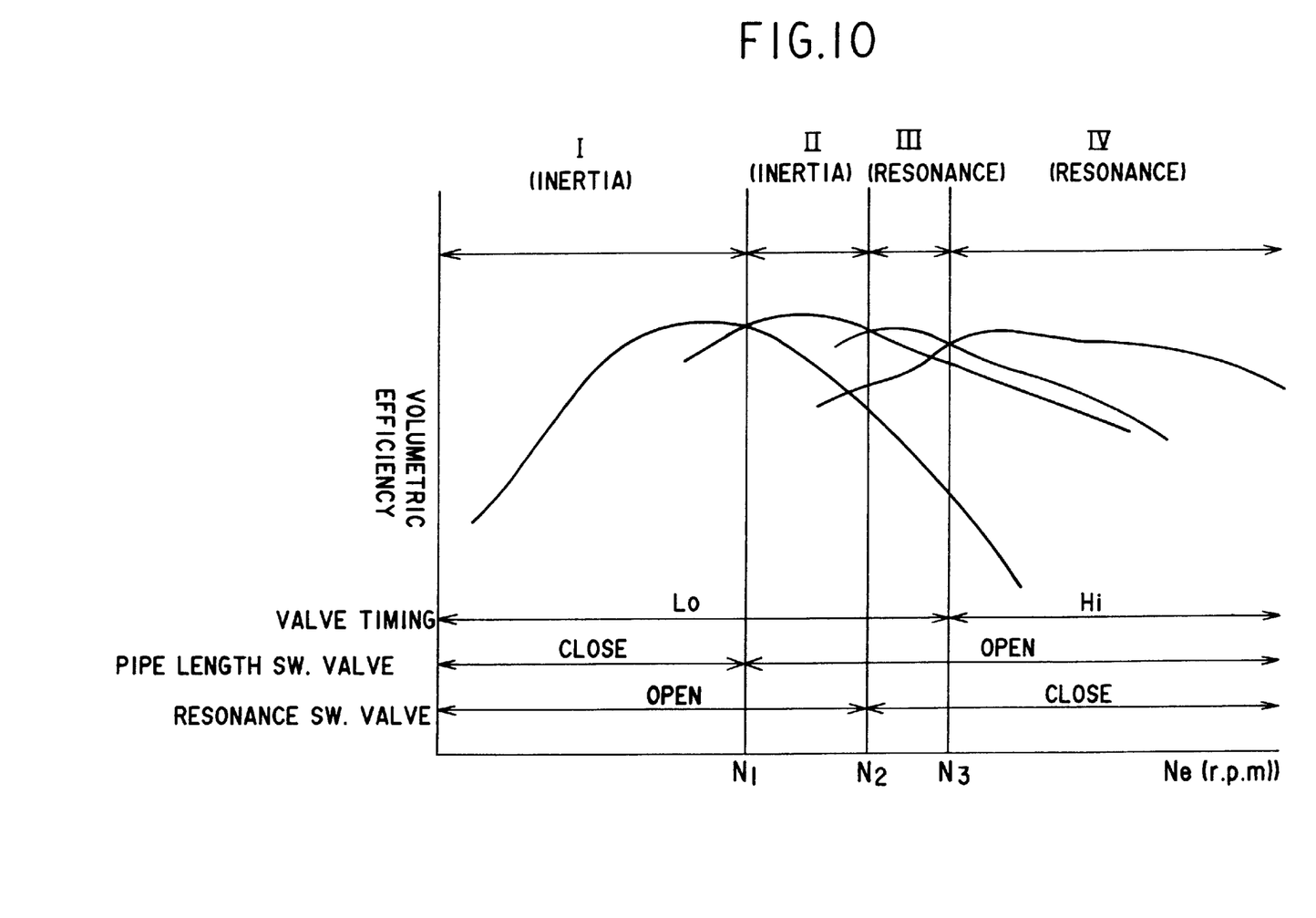
FIG. 10 is a characteristic diagram of the internal combustion engine of FIG. 1.

The variable valve timing mechanisms 12*l*, 12*r* change working characteristic of suction valves to switch over the suction characteristic in two stages of a low speed mode Lo and a high speed mode Hi (FIG. 10). As will be mentioned later, in a high speed rotative speed region of the engine, the suction characteristic is switched over from the low speed mode Lo to the high speed mode Hi in which lift of the suction valve is increased to hasten the valve opening time and delay the valve closing time.

Hereinafter, operation and effect of the variable suction device in the V-type multi-cylinder internal combustion engine 1 will be explained.

Firstly, the suction manifold 3 has variable suction function based on pipe length switchover and resonance switchover.

Supposing that the engine is now in the low speed mode wherein rotative speed Ne of the engine is lower than a predetermined low rotative speed N1 (Ne<Ni), as shown in FIGS. 7 and 10, the pipe length switchover valves 27*l*, 27*r* are closed and the resonance switchover valve 24 is opened so that direct communications between the left first chamber 40*l* and the left manifold suction pipes 21*l* and between the right first chamber 40*r* and the right manifold suction pipes 21*r* are obstructed.

In this case, the left first chamber 40*l* communicates with the left manifold suction pipes through the communication passage 22, the left communication passage 23*l*, the left second chamber 31*l* and the left swirl pipes 32*l* as shown by the arrow B in FIG. 6. With regard to the right suction system, it is the same (FIG. 7). Thus, suction airs taken in the left and right first chambers 40*l*, 40*r* through air-cleaners (not shown) and the left and right throttle bodies 10*l*, 10*r* are supplied to respective cylinders (#1–#8) of the right and left banks 4*r*, 4*l* through the above-mentioned paths, respectively.

In this condition, suction pipe lengths of the right and left suction systems 3*r*, 3*l* are kept long so that a high inertia supercharging effect adapted to the low speed mode of the engine including very low rotative speed region and a high volumetric efficiency are obtained (region I in FIG. 10). Accordingly, output torque in the low speed mode of the engine can be improved.

In addition, all the chambers 40*l*, 40*r*, 31*l*, 31*r* communicate with each other to ensure a sufficient chamber volume which is equal to or larger than that of a base engine having an ordinary suction device, and function as a single large-volume inertia chamber. Therefore, further improvement of volumetric efficiency based on inertia supercharging effect is possible and lowering of volumetric efficiency due to suction air interference and the like in the low speed mode is prevented.

Figure 8:
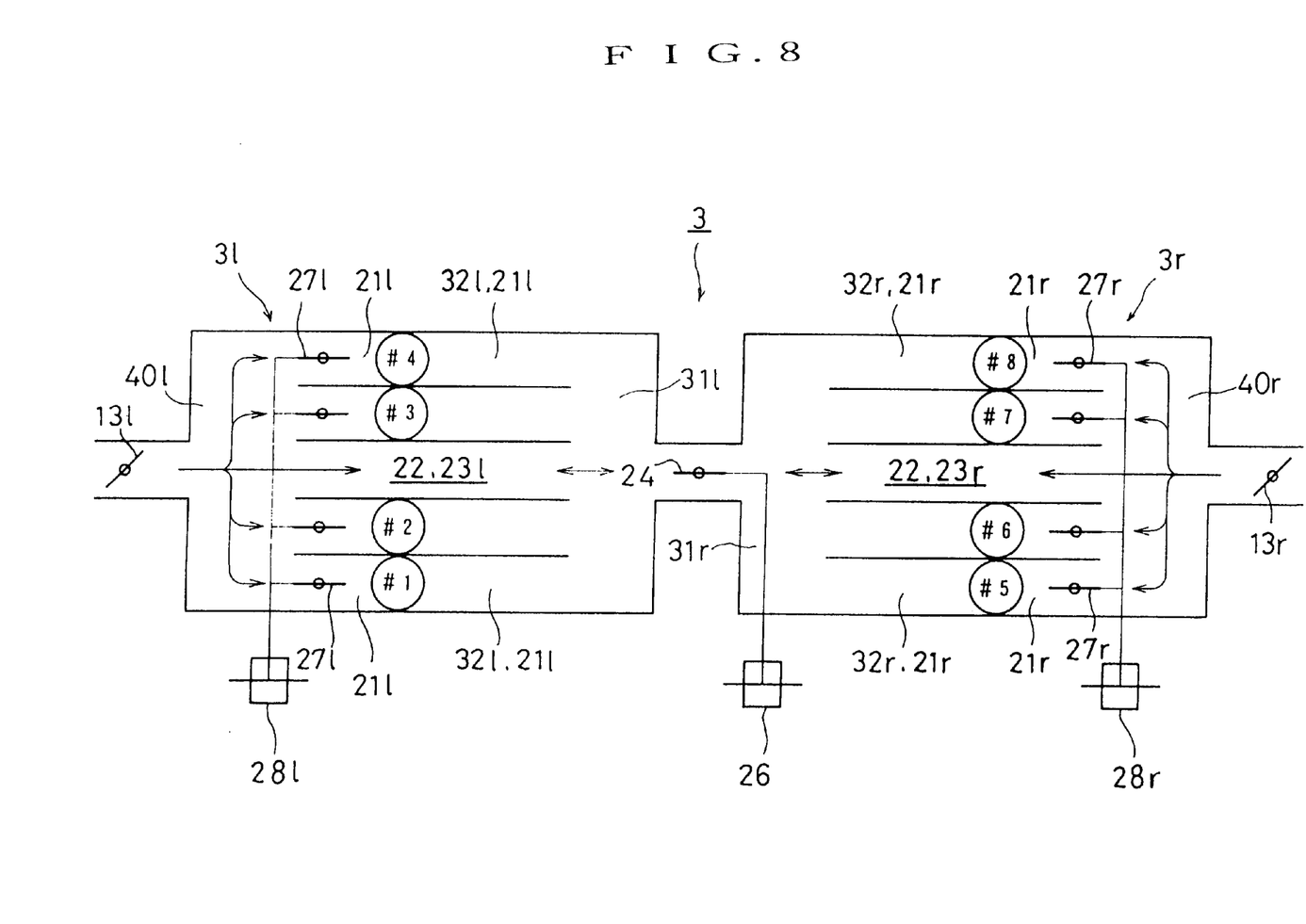
FIG. 8 is an illustration showing another working state of the variable suction device.

In the middle speed mode wherein rotative speed Ne of the engine reaches a middle rotative speed region (N1<Ne<N2, FIG. 10), the pipe length switchover valves 27*l*, 27*r* are opened to short circuit between the left and right first chambers 40*l*, 40*r* and the left and right manifold suction pips 21*l*, 21*r* respectively, as shown in FIG. 8. Thus, the suction passage length becomes shortest (arrow C in FIG. 6) and a high inertia supercharging effect adapted to the middle speed mode of the engine and a high volumetric efficiency can be obtained (region II in FIG. 10). The resonance switchover valve 24 is kept open.

Figure 9:
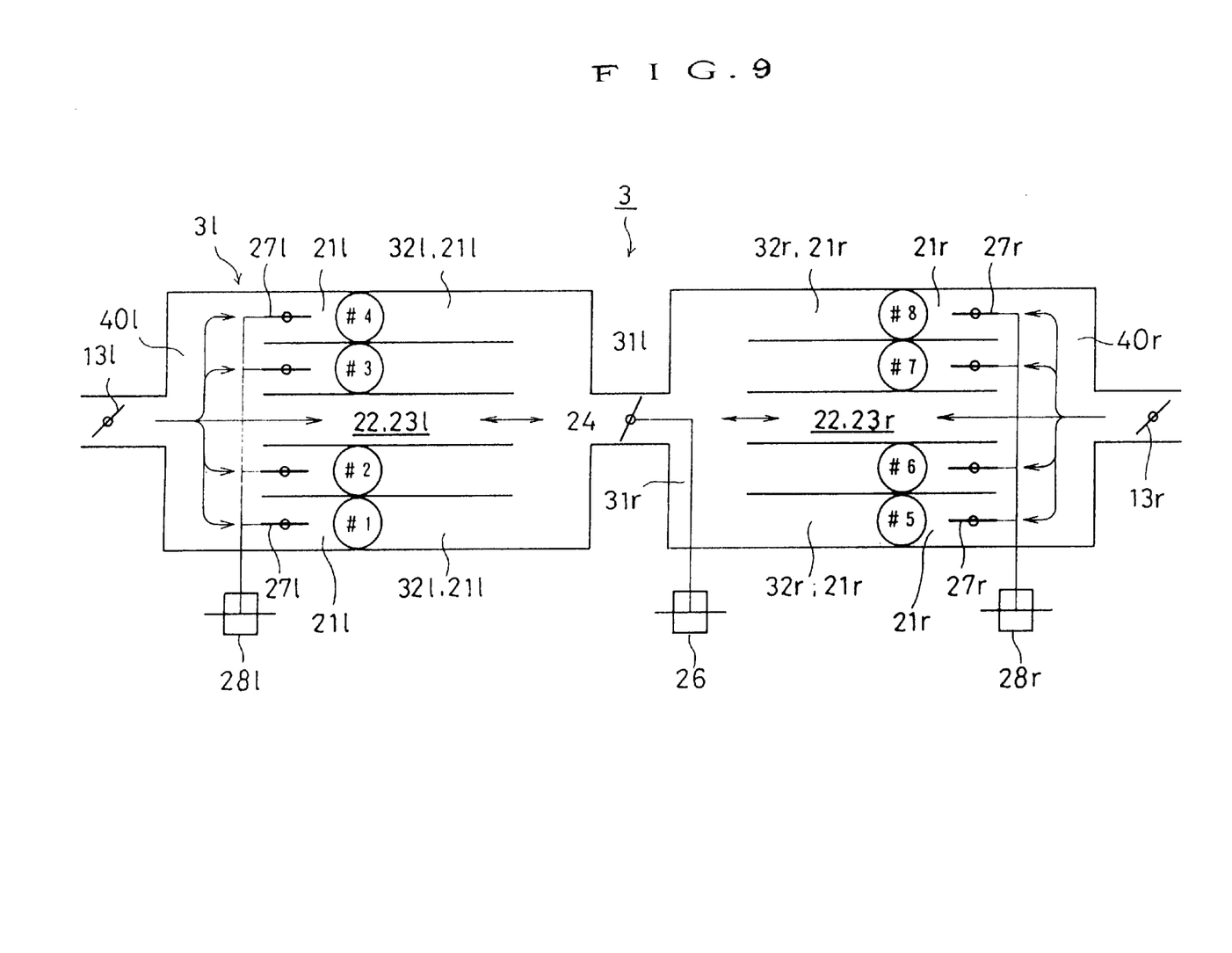
FIG. 9 is an illustration showing further working state of the variable suction device.

In the high speed mode wherein rotative speed Ne of the engine reaches a high rotative speed region (N2<Ne, FIG. 10), the resonance switchover valve 24 is closed and the pipe length switchover valves 27*l*, 27*r* are maintained in the open state as shown in FIG. 9, so that the right suction system 3*r* for the left bank 4*l* and the left suction system 3*l* for the right bank 4*r* are completely separated. Therefore, the right first and second chambers 40r, 31r function as an independent resonance chamber to exert resonance (pulsation) effect on cylinders under suction stroke of the left bank 4l through the right manifold suction pipes 21r and the swirl pipes 32r. Similarly, the left first and second chambers 40l, 31l function as an independent resonance chamber for cylinders of the right bank 4r. Thus, a high resonance supercharging effect and a high volumetric efficiency can be obtained as a whole (region III in FIG. 10).

The variable valve timing mechanisms 12l, 12r exhibit an additive variable suction characteristic in a manner as stated under.

In the high speed mode wherein rotative speed Ne of the engine is increased further to a very high rotative speed region (N2<N3<Ne), as shown in FIG. 10, while the pipe length switchover valves 27l, 27r and the resonance switchover valve 24 are maintained in the former state, the variable valve timing mechanisms 12l, 12r are switched over from the low speed mode Lo to the high speed mode Hi, so that lift of the suction valve is increased, valve opening time is hastened, valve closing time is delayed, overlap of valve opening period with the exhaust valve becomes large, and working characteristic of the suction valve is improved.

As a result, a larger amount of suction air than that at a time when merely suction characteristic of the suction passage is set to the high speed mode can be taken in. In addition, flow resistance of the suction air is reduced to increase suction efficiency, and high suction characteristic (volumetric efficiency) can be obtained as a whole by resonance (pulsation) effect exerted on other cylinders under suction stroke in the corresponding bank. Therefore, a higher resonance supercharging effect and a higher volumetric efficiency can be obtained (region IV in FIG. 10).

As stated above, the suction characteristic is changed by the pipe length switchover and the resonance switchover in the suction manifold 3, and the switchover of the variable valve timing switchover mechanisms 12l, 12r, so that the inertia supercharging effect resulting from inertia which is shown by flow of air column in the suction passage, the resonance (pulsation) supercharging effect resulting from the fact that a positive pressure wave produced at a suction port when a suction valve is closed reciprocates between the suction port and a atmospheric part of the suction passage to return to the suction port, and the supercharging effect due to the working characteristic of the suction valve are pertinently combined and utilized. Thus, the suction characteristic is switched over in four stages over a wide rotative speed range from a very low rotative speed region to a very high rotative speed region to obtain a high volumetric efficiency and a high output torque.

The left first chamber 40l and the right first chamber 40r are connected with each other at respective lengthwise middle portions through the communication passage 22, and the left and right second chambers 31l, 31r are connected at their lengthwise middle portions with the left and right half parts 22l, 22r of the communication passage 22 through the communication passages 23l, 23r respectively. Namely, the left end right second chambers 31l, 31r are connected with the left and right first chambers through the left and right half parts 22l, 22r, respectively. Since the above connecting portions are positioned at lengthwise middle of the left and right banks 4l, 4r, distribution of the suction air to respect suction ports 11l, 11r of cylinders in the left and right banks 4l, 4r is good in all rotative speed regions of the engine, and suction passage lengths from suction sound sources are substantially equalized so that rambling noise can be reduced.

The end portions 32l₃, 32r₃ of the swirl pipes 32l, 32r formed in the suction manifold lower 30 are tangentially connected to the base end portions of the manifold suction pipes 21l, 21r formed in the suction manifold upper 20, and the manifold suction pipes 21l, 21r are connected to the first chambers 40l, 40r through the pipe length switchover valves 27l, 27r, respectively. Therefore, natural and smooth suction passages can be formed in every operation conditions of the engine from the low speed mode to the high speed mode so that suction passage resistance is reduced and engine output is improved.

Since the pipe length switchover valves 27l, 27r, the resonance switchover valve 24 and operation mechanisms thereof can be assembled in the suction manifold upper 20 intensively, the suction manifold 3 can be constituted compact and amount of upward projection of the internal combustion engine main body 2 can be restrained. The suction manifold 3 can be attached to the V-type multi-cylinder internal combustion engine 1 utilizing space between the left and right banks 4l, 4r to restrain full height of the engine.

Although a V-type eight-cylinder internal combustion engine has been described, the present invention can be applied to other V-type multi-cylinder internal combustion engine such as a V-type six-cylinder internal combustion engine, too.

What is claimed is:

1. A V-type multi-cylinder internal combustion engine in which ignition in a right bank and ignition in a left bank occur alternately and at equal intervals, and a suction manifold shaped symmetrically in respect of right and left is disposed between the right and left banks, said suction manifold comprising:

a pair of right and left throttle bases to be connected with respective right and left throttle bodies;

a suction manifold upper positioned between said right and left throttle bases, integrally formed with right first suction passages communicating with respective suction ports of cylinders in said left bank and left first suction passages communicating with respective suction ports of cylinders in said right bank, said right first suction passages and said left first suction passages being arranged one by one alternately crossing each other;

a right first chamber formed at a contact surface portion between said right throttle base and said suction manifold upper;

a left first chamber formed at a contact surface portion between said left throttle base and said suction manifold upper; and a suction manifold lower integrally connected to and positioned under said manifold upper having a right second chamber and a left second chamber, wherein:

said right first chamber and said right second chamber always communicate with each other through a right communication passage;

said left first chamber and said left second chamber always communicate with each other through a left communication passage;

right second suction passages for connecting said right second chamber with said respective suction ports of cylinders in the left bank through said right first suction passages, and left second suction passages for connecting said left second chamber with said respective suction ports of cylinders in the right bank through said left first suction passages are formed around said right and left second chambers and arranged one by one alternately crossing each other; and said suction manifold is fixed on right and left cylinder heads by attaching said suction manifold upper to said right and left cylinder heads.

2. A V-type multi-cylinder internal combustion engine claimed in claim 1, wherein suction additive gas passages are formed on contacting surfaces between said suction manifold and said right and left cylinder heads.

3. A V-type multi-cylinder internal combustion engine claimed in claim 2, wherein said suction additive gas passages comprise respective parts of a blow-by gas passage and a breather passage which circulate within said internal combustion engine.

4. A V-type multi-cylinder internal combustion engine in which ignition in a right bank and ignition in a left bank occur alternately and at equal intervals, and a suction manifold shaped symmetrically in respect of right and left is disposed between the right and left banks, said suction manifold comprising:

a right first chamber to be connected to a right throttle body;

a left first chamber to be connected to a left throttle body;

right first suction passages directly communicating with respective suction ports of cylinders in said left bank;

left first suction passages directly communicating with respective suction ports of cylinders in said right bank;

a right second chamber positioned at a middle bottom part between said right and left banks, always communicating with said right first chamber through a right first communication passage;

a left second chamber positioned at a middle bottom part between said right and left banks, always communicating with said left first chamber through a left first communication passage;

right second suction passages connecting said right second chamber with respective base end portions of said right first suction passages, each formed in shape of a swirl surrounding said left and right second chambers in turn;

left second suction passages connecting said left second chamber with respective base end portions of said left first suction passages, each formed in shape of a swirl surrounding said right and left second chambers in turn;

right first opening-shutting valves disposed in said right first suction passages at upper stream side portions of said base end portions connected to said right second suction passages;

left first opening-shutting valves disposed in said left first suction passages at upper stream side portions of said base end portions connected to said left second suction passages; and a second opening-shutting valve disposed in a second communication passage connecting said right and left first communication passages to each other, said first and second opening-shutting valves being able to be switched over in accordance with rotative speed of the engine so that when the rotative speed rises to a middle rotative speed region said first opening-shutting valves open and when the rotative speed further rises to a high rotative speed region said second opening-shutting valve shuts.

5. A v-type multi-cylinder internal combustion engine claimed in claim 4, wherein said internal combustion engine has a 180 degree type crankshaft.

6. A V-type multi-cylinder internal combustion engine claimed in claim 4, wherein a single large-capacity inertia chamber is obtained by opening said second opening-shutting valve, and right and left resonance chambers independent of each other are obtained by shutting said second opening-shutting valve.

7. A V-type multi-cylinder internal combustion engine claimed in claim 4, wherein said suction manifold is integrally assembled from right and left throttle bases forming said right and left first chambers, said suction manifold upper forming said right and left first suction passages, and said suction manifold lower forming said right and left second suction passages, said first opening-shutting valves and said second opening-shutting valve being disposed in said suction manifold upper.

8. A V-type multi-cylinder internal combustion engine claimed in claim 7, wherein said right first opening-shutting valves and said left first opening-shutting valves are controlled by respective first diaphragms through respective common valve shaft and link mechanisms.

9. A V-type multi-cylinder internal combustion engine claimed in claim 8, wherein said diaphragms are integrated with each other by a common negative pressure chamber interposed between them and disposed at a middle portion on a wall of said suction manifold upper.

10. A V-type multi-cylinder internal combustion engine claimed in claim 9, wherein said second opening-shutting valve is disposed at a substantially central portion of said suction manifold upper and controlled through a link mechanism by a second diaphragm disposed at a middle portion on a wall of said suction manifold upper near said first diaphragms.

11. A V-type multi-cylinder internal combustion engine claimed in claim 10, wherein said first diaphragms and said second diaphragm are disposed on a rear wall of said manifold upper intensively.

12. A V-type multi-cylinder internal combustion engine in which ignition in a right bank and ignition in a left bank occur alternately and at equal intervals, having variable valve timing switchover mechanisms provided at respective cylinders in right and left banks for switching over suction characteristics of the cylinders between a low-speed mode and a high-speed mode by changing working characteristics of suction valves of the cylinders, a suction passage switchover mechanism for switching over suction characteristic of a suction passage among a low-speed mode, a middle-speed mode and a high-speed mode, and a suction manifold shaped symmetrically in respect of right and left disposed between the right and left banks, said variable valve timing switchover mechanisms and said suction passage switchover mechanism being switched over in accordance with rotative speed of said engine, wherein said suction manifold comprising:

a right first chamber to be connected to a right throttle body;

a left first chamber to be connected to a left throttle body;

right first suction passages directly communicating with respective suction ports of cylinders in said left bank;

left first suction passages directly communicating with respective suction ports of cylinders in said right bank;

a right second chamber positioned at a middle bottom part between said right and left banks, always communicating with said right first chamber through a right first communication passage;

a left second chamber positioned at a middle bottom part between said right and left banks, always communicating with said left first chamber through a left first communication passage;

right second suction passages connecting said right second chamber to respective base end portions of said right first suction passages, each formed in shape of a swirl surrounding said left and right second chambers in turn;

left second suction passages connecting said left second chamber to respective base end portions of said right first suction passages, each formed in shape of a swirl surrounding said right and left second chambers in turn;

right first opening-shutting valves disposed in said right first suction passages at upper stream side portions of said base end portions connected to said right second suction passages, for connecting said right first suction passages to said right first chamber to switch over the suction characteristic of the suction passage from the low-speed mode to the middlespeed mode;

left first opening-shutting valves disposed in said first left suction passages at upper stream side portions of said base end portions connected to said second left suction passages, for connecting said left first suction passages to said left first chamber to switch over the suction characteristic of the suction passage from the low-speed mode to the middle-speed mode;

a second opening-shutting valve disposed in a second communication passage connecting said right and left first communication passages to each other for intercepting communication between said right and left first communication passages to switch over the suction characteristic of the suction passage from the middle-speed mode to the high-speed mode, thereby, after switchover of the suction characteristic by said second opening-shutting valve, switchover of the suction characteristic from the low-speed mode to the high-speed mode by said variable valve timing switchover mechanisms is carried out.

13. A V-type multi-cylinder internal combustion engine claimed in claim 12, wherein said internal combustion engine has a 180 degree type crankshaft.

14. A V-type multi-cylinder internal combustion engine claimed in claim 12, wherein a single large-capacity inertia chamber is obtained by opening said second opening-shutting valve in low and middle rotative speed regions of the internal combustion engine, said large-capacity inertia chamber being formed by said right and left first chambers, said right and left second chambers, said right and left first communication passages and said second communication passage.

15. A V-type multi-cylinder internal combustion engine claimed in claim 14, wherein long suction passages passing through said second suction passages are formed by shutting said first opening-shutting valves in a low rotative speed region of the engine.

16. A V-type multi-cylinder internal combustion engine claimed in claim 14, wherein right and left resonance chambers independent of each other are obtained by shutting said second opening-shutting valve in middle and high rotative speed regions of the engine.

17. A v-type multi-cylinder internal combustion engine claimed in claim 16, wherein said variable valve timing mechanism is switched over in the high rotative speed region of the engine so as to increase lift of the suction valve, hasten suction valve opening time and delay suction valve closing time.

\* \* \* \* \*